Oct. 27, 1931.  C. C. FARMER  1,828,963
AUTOMATIC TRAIN PIPE COUPLING
Filed Dec. 10, 1928    2 Sheets-Sheet 2
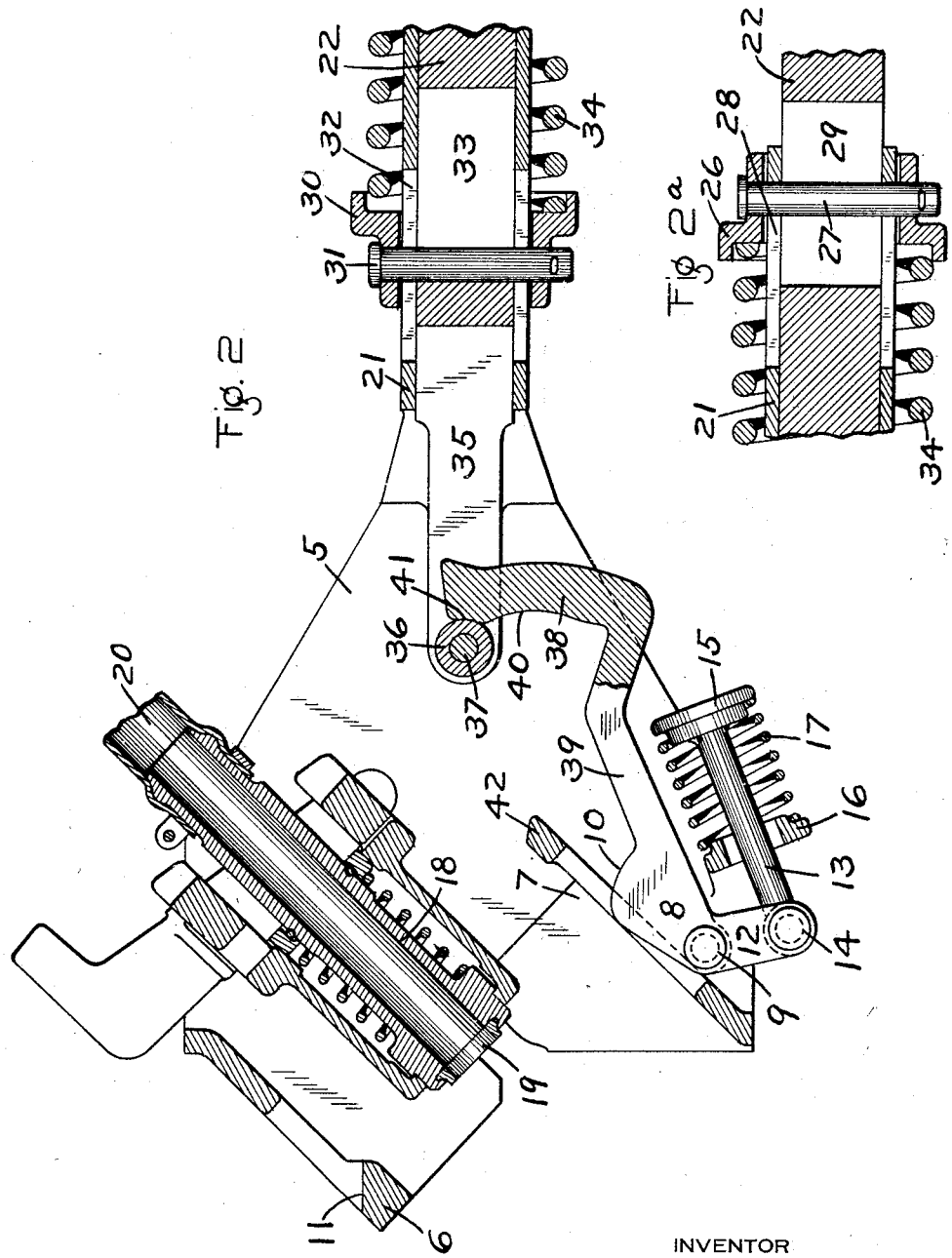
INVENTOR
CLYDE C. FARMER
BY Wm. M. Cady
ATTORNEY Patented Oct. 27, 1931

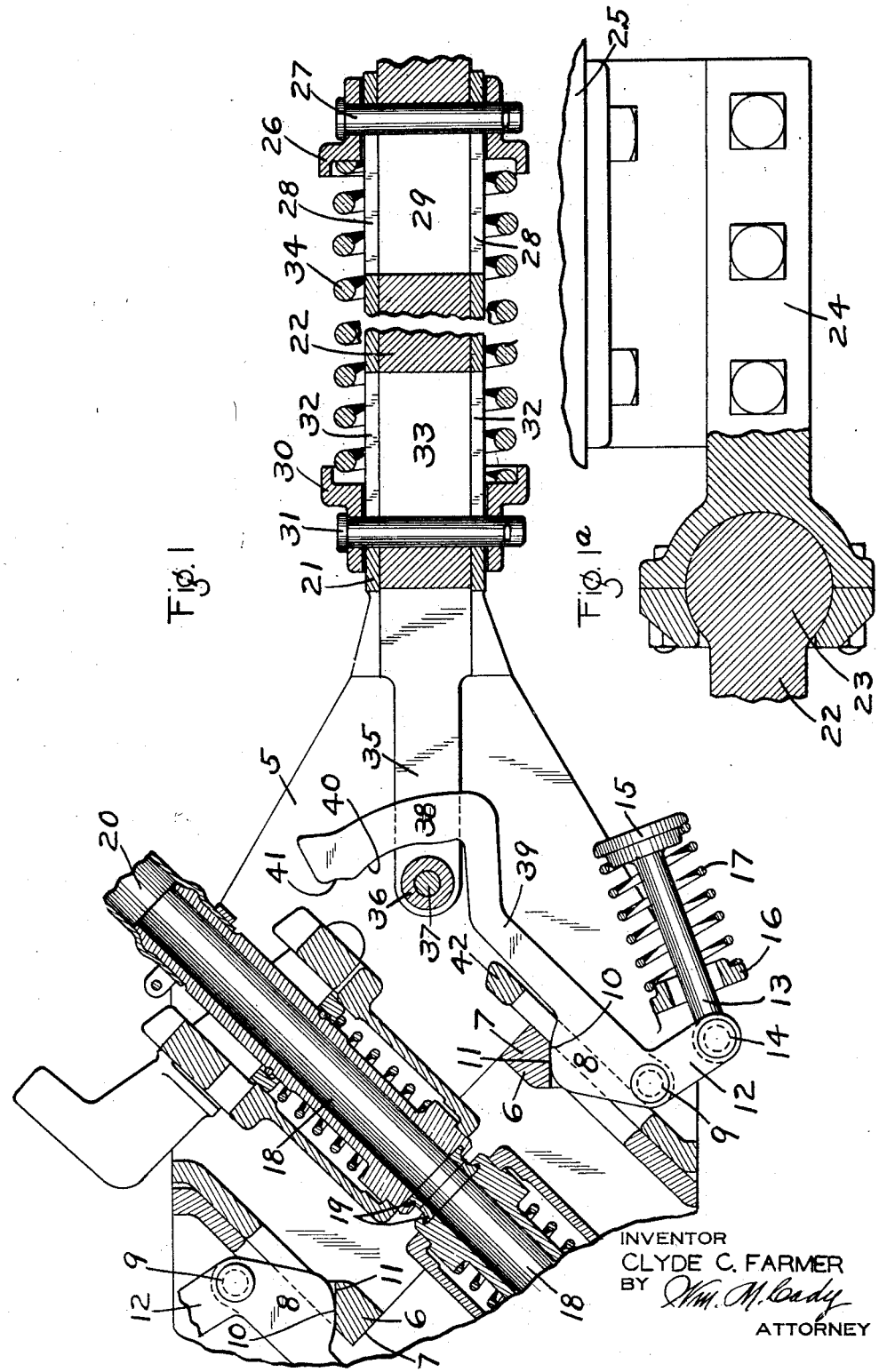

1,828,963

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

AUTOMATIC TRAIN PIPE COUPLING

Application filed December 10, 1928. Serial No. 324,861.

This invention relates to automatic train pipe couplings, and more particularly to the type known as the tight or rigid lock coupling.

An object of the invention is to provide a train pipe coupling of the above mentioned type with means for automatically locking the coupling head with the head of a counterpart coupling when cars are brought together for coupling up.

Another object of the invention is to provide a train pipe coupling in which the coupling head is connected to the head of a counterpart coupling by an automatically actuated cam mechanism.

Another object of the invention is to provide a train pipe coupling of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings; Figures 1 and 1ª are longitudinal sections of an automatic train pipe coupling embodying the invention, showing the same coupled to a counterpart coupling; and Figs. 2 and 2ª are views similar to Figs. 1 and 1ª, showing the coupling head in unlocked position.

Referring to the drawings, the automatic train pipe coupling may comprise a head 5 having a projecting nose 6 adapted to engage in a recess 7 of a counterpart coupling head.

A lever 8, pivoted in the coupling head 5, at 9, has a cam face 10 for engaging the face 11 of a counterpart coupling head, to lock the two coupling heads together when the same are coupled in the manner shown in Fig. 1.

Extending laterally from the lever 8, is an arm 12, to which a rod 13 is pivotally connected by a pin 14. The outer end of the rod 13 is provided with a head 15, and interposed between said head and a fixed abutment 16, is a coil spring 17.

Mounted in the coupling head 5 is a conduit 18, the forward or nose end of which is provided with a gasket 19 adapted to engage the corresponding gasket on a counterpart coupling and make a fluid tight joint when the coupling heads are connected together. The rear end of the conduit 18 is connected to a train pipe 20.

The rear end of the coupling head 5 is formed with a tubular extension or sleeve 21 which constitutes a guide for the forward end of a stem 22.

The opposite end of the stem 22 is provided with a ball section 23 which is mounted in a bracket 24 suspended from the car coupler 25.

A follower collar 26 is slidably mounted on the rear portion of the sleeve 21 and carries a pin 27 which extends through elongated slots 28 in the sleeve 21 and also through an elongated slot 29 in the stem 22.

A front follower collar 30 is also mounted on the sleeve 21 and carries a pin 31 which extends through elongated slots 32 in the sleeve 21 and through an elongated slot 33 in the stem 22.

A coil spring 34 is interposed between the collars 26 and 30 and the spring is adapted to be compressed upon movement of either collar relative to the other when the coupling head 5 is telescoped or otherwise moved relative to the stem 22. The spring 34 is also under initial compression which tends to hold the coupling head 5 extended with respect to the stem 22 when the coupling is uncoupled from a counterpart coupling.

At the front end, the stem 22 is provided with an extended portion 35, on which is mounted a roller 36, by means of a pin 37.

The roller 36 is disposed along the longitudinal center line of the stem 22, and it is adapted to be engaged, when the coupling is being uncoupled from a counterpart coupling, by the hook-shaped end 38 of an arm 39 extending from the lever 8.

The side of the end portion 38 of the arm 39 facing the roller 36 is formed with a cam surface 40, which terminates, near the extremity of the arm 39 in an arcuate notch or recess 41.

For the purpose of limiting the outward movement of the arm 39, when the coupling is uncoupled from a counterpart coupling, the head 5 is provided with an abutment or stop 42.

In operation, when the usual car couplers of adjoining cars are uncoupled in the usual manner, the coupling heads 5 will remain coupled and locked together until the cars have moved apart sufficiently to pull the coupling heads outwardly of the stems 22.

This action will move the ends 38 of the arms 39 toward the ends of the stems 22, bringing the cam surfaces 40 into engagement with the rollers 36.

Inasmuch as the stems 22 of the two cars will be pulled away from each other when the cars are uncoupled, when the rollers 36 engage the cam surfaces 40, the tension of the rollers against the cam surfaces 40 will be such that the arms 39 will be moved laterally from the position shown in Fig. 1 to the position shown in Fig. 2. The cam surfaces 10 of the levers 8 will thus be withdrawn from the faces 11 of the coupling heads, and the coupling heads will be unlocked, thereby permitting the noses 6 of the two coupling heads to be withdrawn from the recesses 7 when the coupling heads 5 separate.

When the interlocked coupling heads are unlocked, in the manner just described, the rollers 36 will engage in the recesses 41 and the coupling heads 5 will be extended with respect to the stem 22, as shown in Fig. 2. The movement of the arms 39 to cause the withdrawal of the levers 8 from the noses 6, swings the arms 12 so as to draw the heads 15 toward the fixed abutment 16, thereby compressing the springs 17.

As shown in Figs. 2 and 2ª, when the device is in unlocked position, the relative positions of the slots 28 and 32 of the stems 21 will be shifted longitudinally with respect to the slots 29 and 33, and the springs 34 will be compressed between the collars 26 and 30 which are brought closer together. Therefore, when the noses 6 clear the levers 8 when the coupling heads separate, the springs 34 and 17 will expand, thereby returning the parts to the normal coupling position, ready for again coupling up, the stop 42 limiting the outward swinging movement of the arm 39, as will be readily understood.

When the cars are brought together for coupling up, the projecting nose 6 of one train pipe coupling head enters the recess 7 of the counterpart coupling head, and when the nose 6 passes by the lever 8, the latter is forced inwardly.

When the gaskets 19 meet to connect the forward ends of the conduits 18, the spring 17 will force the lever 8 outwardly, thereby engaging the cam surface 10 with the face 11 of the counterpart coupling head, so as to interlock the coupling heads together in the manner shown in Fig. 1.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. A device of the class described comprising a train pipe coupling having a rearwardly extending sleeve section and a lever for locking the coupling head in its coupled position, a stem mounted in said sleeve section and having one end anchored to the car and having a roller at the other end, and an arm projecting from said lever and extending across said stem in the path of the roller.

2. A device of the class described comprising a stem anchored at one end and having a roller at the other end, a coupling head slidably mounted on the stem and having a lever for locking the coupling head in its coupled position, an arm projecting from said lever and extending across said stem, and a cam face on the side of the arm facing the roller.

3. A device of the class described comprising a movable coupling head having a lever for locking the coupling in its coupling position with a counterpart coupling, a fixed supporting member for the coupling having a roller disposed within the coupling head, and an arm projecting from said lever and adapted to be engaged by said roller.

4. A device of the class described comprising a movable coupling head having a lever for locking the coupling in its coupling position, a fixed supporting member for the coupling having a free end terminating within said coupling head, and an arm projecting from said lever and having a cam face extending across the end of said supporting member.

5. A device of the class described comprising a fixed supporting member having a free end, a coupling head telescopingly mounted on said supporting member, a roller on the free end of said supporting member, a lever carried by said coupling head for locking the coupling in its coupling position with a counterpart coupling, and an arm projecting from said lever and adapted to be engaged by said roller.

In testimony whereof I have hereunto set my hand, this 7th day of December, 1928.

CLYDE C. FARMER.